United States Patent Office 3,752,809
Patented Aug. 14, 1973

3,752,809
3-(5-NITRO-2-IMIDAZOLYL-METHYLENAMINO)-2-OXAZOLIDINONES
Clemens Rufer, Eberhard Schroder, and Hans-Joachim Kessler, Berlin, Germany, assignors to Schering Aktiengesellschaft, Berlin and Bergkamen, Germany
No Drawing. Filed Apr. 16, 1970, Ser. No. 29,236
Claims priority, application Germany, Apr. 17, 1969, P 19 20 150.4
Int. Cl. C07d 85/28
U.S. Cl. 260—240 A
34 Claims

ABSTRACT OF THE DISCLOSURE

3 - (5 - nitro - 2 - imidazolyl - methylenamino) - 2-oxazolidinones of the formula

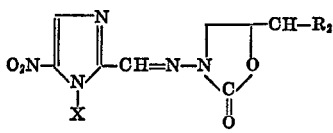

wherein X is substituted or unsubstituted hydrocarbon and R is hydrocarbon-thiol or -thione or a tertiary amino group, are antimicrobials, especially against *Trichomonas vaginalis*.

BACKGROUND OF THE INVENTION

The effectiveness of nitroimidazoles against trichomonads has been known since the discovery of the antibiotic azamycin (2-nitroimidazole, S. Nakamura and H. Umezawa, J. Antibiotics (Tokyo), 9 A, 66 [1955]). These, and other 2-nitroimidazoles, however, did not prove to be better than metronidazole (see below ) (G. C. Lancini, E. Lazzari, R. Pallanea, Il Farmaco Ed Sc. 21, 278 [1966]), and the $ED_{50}$ and $LD_{50}$ values were considerably less favorable (E. Grunberg, E. Titsworth, Antimicrobial Agents and Chemotherapy 1965, *1966*, 478). Of the 5-nitroimidazoles, only the commercial preparation metronidazole (5 - nitro-2-methyl-1-(2 - hydroxyethyl)-imidazole), with a minimum inhibitory concentration of 2.5 γ/ml. against *Trichomonas vaginalis*, evolved as the best of a large number of synthesized compounds. See C. Cosar, "Arzneimittelforschung," *16*, 23 (1966); also, inter alia, French Pat. 1,212,028.

Nitroimidazoles carrying, like the conventional antibacterial nitrofurans, a functionalized carbon atom in the 2-position, such as, for example, an aldehyde, carboxyl, or nitrile group, are known from Australian application 55,580/65 and Dutch application 64/09120. In the Australian application, are also described, inter alia, the functional derivatives of the 2-aldehydes, e.g., semicarbazones, hydrazones, etc., and the antitrichomonal activity is emphasized. Minimum inhibitory concentrations of such compounds are not reported.

SUMMARY OF THE INVENTION

This invention is directed to the condensation products of the 1-substituted 5-nitro-2-imidazolyl aldehydes and 3-amino-oxazolidinones, which compounds possess activity against *Trichomonas vaginalis* greater than metronidazole.

DETAILED DISCUSSION

The novel 3-(5-nitro-2-imidazolyl-methylenamino)-2-oxazolidinones of this invention have the formula

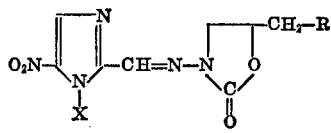
(I)

wherein X is a saturated or unsaturated hydrocarbon group of 1–5 carbon atoms, which is unsubstituted or substituted in the 2-position by hydroxy, acyloxy of 1–5 carbon atoms or benzoyloxy, and R is the group S—A, SO—A, $SO_2$—A or

wherein A is a saturated or unsaturated hydrocarbon group containing 1–10 carbon atoms, and $R_1$ and $R_2$, which can be the same or different, are saturated or unsaturated hydrocarbon groups of 1–5 carbon atoms, a carbocyclic aryl group, e.g., a phenyl or benzyl, or, together with the amino nitrogen atom, a heterocyclic amino substituent containing, e.g., 1 to 14, preferably 1 to 6 carbon atoms and 1 to 3, preferably 1 or 2 heteroatoms including the amino nitrogen atom and 0 to 3, preferably 0 to 1 rings, which substituent can be substituted by one or more alkyl groups of 1 to 5 carbon atoms, and contain a N-, O- or S-atom in addition to the amino nitrogen atom as a ring member; both in free base form of their physiologically acceptable acid addition salts.

Examples of A and X which are saturated hydrocarbon are methyl, ethyl, propyl, butyl, sec.-butyl, iso-butyl, tert.-butyl, hexyl, heptyl, octyl, nonyl and decyl. Examples of unsaturated hydrocarbon are ethenyl, ethynyl, allyl, propynyl, 1-methylallyl, crotyl, butadienyl, 2-octenyl, 6-octenyl, etc. Preferred are those containing 1–4 carbon atoms and a single unsaturation, preferably a double bond in the β-position. Examples of substituted hydrocarbon are hydroxyethyl, γ-hydroxypropyl, acyloxyalkyl wherein the alkyl group preferably is ethyl and the acyloxy group is lower-alkanoyl or benzoyl. Examples of S—A, SO—A and $SO_2$—A are methylthio, ethylthio, isopropylthio, butylthio, hexylthio, octylthio, methylsulfoxid, ethylsulfoxid, isopropylsulfoxid, butylsulfoxid, hexylsulfoxid, methylsulfonyl, ethylsulfonyl, etc.

Specific examples of compounds of the Formula I in which R is the group SO—A:

3-(5-nitro-1-methyl-2-imidazolyl-methylenamino)-5-isopropylthiomethyl-2-oxazolidinone-S-oxid.
3-(5-nitro-1-methyl-2-imidazolyl-methylenamino)-5-butylthiomethyl-2-oxazolidinone-S-oxid.

Other examples of compounds of this invention are those having one or more, usually not more than four and preferably not more than three, simple substituents on the X group, e.g., chloro and fluoro, lower-alkyl, including methyl, ethyl, propyl and octyl, trifluoromethyl, trichloromethyl, lower-alkoxy, including methoxy and ethoxy, aryloxy, and aralkoxy, including benzyloxy and phenoxy, hydroxy, carboxy, nitro, sulfato, acetamido, aryl, including phenyl and aralkyl, including benzyl.

Preferably, so that the activity and characteristic structure is predominantly that of a 3-(5-nitro-2-imidazolyl-methylenamino)-5-substituted - 2 - oxazolidinone, the sum of the molecular weight of these substituents is less than the sum of the molecular weights of the imidazole and its 2-position substituent, e.g., less than 200 and more preferably less than 150, and preferably less than 8 carbon atoms and less than 4 heteroatoms.

Although the compounds of this invention in which X is an acyloxyalkyl group are preferably those of Formula I wherein the acyloxy group is lower-alkanoyloxy or benzoyloxy, this invention also relates to compounds of Formula I in which X is an esterified hydroxy-alkyl group in which the acyloxy group contains 1 to 14, preferably 1 to 7 carbon atoms and 0 to 4, preferably 0 to 1, rings and 0 to 3, preferably 0 to 2, hetero-atoms. Examples of esterified hydroxy groups are acyloxy groups wherein the acyl group is the acyl radical of, for example, an aryl or alkaryl acid, e.g., benzoic, 2,3- or 4-methylbenzoic, 2,3-, 2,4- 2,5- 2,6- 3,4- and 3,5-dimethylbenzoic, ethylbenzoic, 2,4,6-trimethylbenzoic, 2,4,6-triethylbenzoic, α-naphthoic, 3-methyl-α-naphthoic, an aromatic hydroxyacid, e.g., salicylic acid, an aromatic aminoacid, e.g., para-aminosalicylic, para-aminobenzoic, other aromatic hetero-substituted acids, e.g., 2,3,4-trimethoxybenzoic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxy-indolyl-3-acetic, N-methylmorpholyl-2-carboxylic lysergic, pyrrolyl-2-carboxylic, or other acyl acid.

Examples of

are dimethylamino, methyl, ethylamino, diethylamino, methyl, n-propylamino, dipropylamino, diisopropylamino, methyl, isobutylamino, di-n-butylamino, pyrrolidino, 2-methylpyrrolidino, 2,5 - dimethylpyrrolidino, 3 - ethylpyrrolidino, piperidino, homopiperidino, morpholino, imidazole, triazole, tetrazole, oxazole, dioxazole, isothiazole, pyridazine, pyrimidine, piperazine, isoxazine, morpholine, indole, benzoxazine, anilino, N-lower-alkylanilino, benzylamino, N - lower - alkyl - benzylamino, o-toluidino, p-toluidino, N-lower-alkyl-phenylethylamino, etc.

Preferred classes of compounds of this invention are those defined by Formula I wherein:

(a) X=lower-alkyl, i.e., containing 1–4 carbon atoms, or preferably $CH_3$;

(b) X=β-hydroxyethyl or esterified - β - hydroxyethyl, preferably wherein the acyl group thereof is alkanoyl, e.g., of 1–4 carbon atoms, or benzoyl; and (c) R=dialkylamino wherein the alkyl groups are the same and each contain 1–5 carbon atoms, preferably diethylamino, (d) R=dialkylamino as defined above at least one of which alkyl groups contain a double bond, preferably diallylamino, or (e) R=alkyl-thio of 1–10 carbon atoms, preferably 3–8 carbon atoms, or (f) R=arylamino, e.g., anilino or N-alkylanilino, (g) R is —S-alkyl, —S=O alkyl or

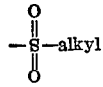

of 1–6 carbon atoms, e.g., wherein the alkyl group is methyl, ethyl, isopropyl, butyl, amyl, hexyl, etc.

The compounds of this invention can be produced by condensing 5-nitro-2-imidazolyl aldehydes with 3-amino-oxazolidinones. Others can be produced by oxidizing a sulfur atom, esterifying a hydroxy group or saponifying an ester group of the condensation product and/or converting the thus-obtained compounds from free base form into the physiologically compatible salts thereof, or vice versa.

The condensation of 5-nitro - 2 - imidazolyl aldehydes with 3-amino-oxazolidinones can be conducted in water or an organic solvent, e.g., a lower alcohol, at room temperature or an elevated temperature. In the presence of acids, the reaction takes place more rapidly and with a higher yield. In this case, the corresponding acid addition salts are obtained.

The oxidation of a sulfur atom can be conducted in a conventional manner, for example with potassium permanganate or hydrogen peroxide. Saponification of an ester group, esterification of a hydroxy group and conversion into the physiologically acceptable acid addition salt, can be effected in the conventional manner. Suitable acids for the formation of acid addition salts are, for example: hydrochloric acid, sulfuric acid, acetic acid, lactic acid, succinic acid, and tartaric acid. Preferred acids are those which form physiologically acceptable acid addition salts. Others can be employed for isolation, purification and/or characterization purposes.

The novel compounds exhibit good antimicrobial effects, especially against *Trichomonas vaginalis*, and can thus be employed in the treatment of *Trichomonas vaginalis* infections. Table I below demonstrates the superior effect of the compounds of this invention against *Trichomonas vaginalis* compared with metronidazole. The toxicity of the novel compounds is low.

| Substance: | Minimum inhibitory concentration against *trichomonas vaginalis* γ/ml. |
|---|---|
| 3-(5-nitro - 1 - methyl-2-imidazolyl-methylen-amino)-5-dimethylaminomethyl - 2 - oxazolidinone | 0.40 |
| 3-(5-nitro - 1 - ethyl - 2 - imidazolylmethylen-amino) - 5 - diethylaminomethyl - 2 - oxazolidinone hydrochloride | 0.40 |
| 3-(5-nitro - 1 - butyl - 2 - imidazolylmethylen-amino) - 5 - diethylaminomethyl - 2 - oxazolidinone | 0.40 |
| 3-(5-nitro - 1 - methyl - 2 - imidazolylmethylen-amino) - 5 - dibutylaminomethyl - 2 - oxazolidinone | 0.20 |
| 3-(5-nitro - 1 - methyl-2-imidazolyl-methylen-amino) - 5 - diallylaminomethyl - 2 - oxazolidinone | 0.10 |
| 3-(5-nitro - 1 - methyl-2-imidazolyl-methylen-amino) - 5 - N - methyl-anilinomethyl-2-oxazolidinone | 0.40 |
| 3-(5-nitro - 1 - methyl-2-imidazolyl-methylen-amino) - 5 - isopropylthiomethyl - 2 - oxazolidinone | 0.05 |
| 3-(5-nitro - 1 - methyl-2-imidazolyl-methylen-amino) - 5 - butylthiomethyl - 2 - oxazolidinone | 0.05 |
| 3-(5-nitro - 1 - methyl-2-imidazolyl-methylen-amino) - 5 - hexylthiomethyl - 2 - oxazolidinone | 0.40 |
| 3-(5-nitro - 1 - methyl-2-imidazolyl-methylen-amino) - 5 - octylthiomethyl - 2 - oxazolidinone | 0.40 |
| Metronidazole (comparison compound) | 1.56 |

The compounds of Formula I are useful in the treatment of *Trichomonas vaginalis* infections. For such use, they can be formulated into conventional drug forms with the additives, carrier substances, and flavoring agents customary in pharmaceutical preparations which do not deleteriously react with the effective agents, employing conventional methods. For oral application, particularly suitable are tablets, dragées, caspules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets. The concentration of the effective agent in the thus-formulated compositions is dependent on the activity of the specific compound employed, the responsiveness of the individual patient and the mode of administration. Generally, they contain about 0.05 to 2.0 g., preferably about 0.05 to 0.5 g. of a compound of this invention and 0.1 to 5 g. of a pharmaceutical carrier per unit dose.

For topical application, the compounds of this invention can be applied as a powder, solution suspension, foam or aerosol or as vaginal tablets and suppositories. For parenteral application, aqueous or oily solutions or suspensions can be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

310 mg. of 5-nitro-1-methyl-2-imidazolyl aldehyde and 374 mg. of 3-amino-5-diethylaminomethyl-2-oxazolidinone are boiled in 4 ml. of ethanol with 4 ml. of 12.5 N methanolic hydrochloric acid for 1 hour. After cooling, the reaction solution is mixed with a small amount of isopropyl alcohol and ether. After vacuum-filtering and recrystallization from isopropyl alcohol-methanol, 310 mg. of 3-(5-nitro-1-methyl-2-imidazolylmethylamino)-5-diethylaminomethyl-2-oxazolidinone is obtained as the hydrochloride, M.P. 233–234° C.

EXAMPLE 2

2.5 g. of 5-nitro-1-methyl-2-imidazolyl aldehyde and 3 g. of 3-amino-5-piperidinomethyl-2-oxazolidinone are boiled in 320 ml. of alcohol with 1.5 ml. of 12.5 N methanolic hydrochloric acid for 2 hours. After cooling and vacuum-filtering, 4 g. of 3-(5-nitro-1-methyl-2-imidazolyl - methylenamino)-5-piperidinomethyl-2-oxazolidinone is obtained as the hydrochloride, M.P. 227–229° C.

The free base is obtained from this compound by taking up 1 g. of the hydrochloride in 3 ml. of water, mixing with 4 N sodium hydroxide solution until a pH of 10 is attained, and vacuum-filtering. Yield: 600 mg., M.P. 171–173° C.

EXAMPLE 3

414 mg. of 5-nitro-1-methyl-2-imidazolyl aldehyde and 532 mg. of 3-amino-5-piperidinomethyl-2-oxazolidinone are allowed to stand in 5 ml. of ethanol for 5 hours at room temperature. Vacuum-filtering and recrystallization from ethanol results in 60 mg. of 3-(5-nitro-1-methyl-2-imidazolyl-methylenamino) - 5 - piperidinomethyl-2-oxazolidinone, M.P. 171–173° C.

The hydrochloride is obtained from this product by taking same up in acetone, mixing with methanolic hydrochloric acid, and precipitation with ether. Yield: 30 mg. from 28 mg. of free base; M.P. 227–229° C.

EXAMPLE 4

310 mg. of 5-nitro-1-methyl-2-imidazolyl aldehyde and 402 mg. of 3-amino-5-morpholinomethyl-2-oxazolidinone are boiled in 6 ml. of ethanol with 2 ml. of 11.8 N methanolic hydrochloric acid for 4 hours. Cooling and vacuum-filtering results in 553 mg. of 3-(5-nitro-1-methyl-2-imidazolyl-methylenamino) - 5 - morpholino-methyl-2-oxazolidinone as the hydrochloride, M.P. 214–215° C.

EXAMPLE 5

310 mg. of 5-nitro-1-methyl-2-imidazolyl aldehyde and 430 mg. of 3-amino - 5 - (4-methylpiperazinomethyl)-2-oxazolidinone are stirred in 3 ml. of water together with 3 ml. of 1 N hydrochloric acid. After allowing the solution to stand for 1 hour at room temperature, it is brought to a pH of 4–5 with 1 N potassium hydroxide, and the thus-produced crystals are vacuum-filtered and recrystallized from methanol. Yield: 617 mg. (3-(5-nitro-1-methyl-2-imidazolyl - methylenamino)-5-(4-methylpiperazinomethyl)-2-oxazolidinone as the hydrochloride, M.P. 245–246° C.

EXAMPLE 6

5.15 g. of 5-nitro-1-methyl-2-imidazolyl aldehyde and 5.4 g. of 3-amino-5-methylthiomethyl-2-oxazolidinone are boiled in 13 ml. of methanol with 13 ml. of 12.5 N methanolic hydrochloric acid for two hours. Cooling and vacuum-filtering yields 3.0 g. of 3-(5-nitro-1-methyl-2-imidazolyl-methylenamino) - 5 - methylthiomethyl-2-oxazolidinone, M.P. 173–174° C.

EXAMPLE 7

3.0 g. of 5-nitro-1-methyl-2-imidazolyl aldehyde and 3.4 g. of 3-amino-5-ethylthiomethyl-2-oxazolidinone are treated as described in Example 6. After cooling and mixing the solution with water, 1.6 g. of 3-(5-nitro-1-methyl-2-imidazolyl - methylenamino)-5-ethylthiomethyl-2-oxazolidinone is obtained, M.P. 80–81° C. After recrystallization from methanol, the melting point rises to 129°–131° C.

EXAMPLE 8

1.06 g. of 5-nitro-1-methyl-2-imidazolyl aldehyde and 1.3 g. of 3-amino-5-isopropylthiomethyl-2-oxazolidinone are treated as set forth in Example 7. Yield: 950 mg. of 3-(5-nitro-1-methyl - 2 - imidazolyl-methylenamino-5-isopropylthiomethyl)-2-oxazolidinone, M.P. 148–150° C.

EXAMPLE 9

1.45 g. of 5-nitro-1-methyl-2-imidazolyl aldehyde and 2 g. of 3-amino - 5 - butylthiomethyl-oxazolidinone are treated as set out in Example 7. By recrystallizing the reaction product several times from methanol, 460 mg. of 3-(5-nitro-1-methyl-2-imidazolyl - methylamino)-5-butylthiomethyl - 2 - oxazolidinone is obtained, M.P. 111–113° C.

EXAMPLE 10

596 mg. of 3-(5-nitro-1-methyl-2-imidazolyl-methylenamino)-5-methylthio-2-oxazolidinone in 12 ml. of acetic acid is mixed dropwise with 2 ml. of 30% hydrogen peroxide in such a manner that the temperature remains below 30° C. After allowing the reaction mixture to stand for 3 days at room temperature, it is evaporated to dryness under a vacuum; the residue is crystallized with water, and the vacuum-filtered precipitate is recrystallized from acetone-water. Yield: 168 mg. of 3-(5-nitro-1-methyl-2-imidazolyl - methylenamino)-5-methylsulfonylmethyl-2-oxazolidinone, M.P. 216–218° C.

EXAMPLE 11

18 g. of 3-dimethylamino-1,2-epoxypropane are added dropwise to 42 g. of hydrazine hydrate, warmed to 55° C.; during this procedure, the temperature rises to 95° C. After another 15 minutes at 100° C., the reaction mixture is evaporated to dryness and distilled, thus obtaining 17.3 g. of 1-hydrazino-3-dimethylamino-2-propanol, B.P. 91–95° C. at 0.05 mm. Hg. This product is added dropwise, together with 16.9 g. of diethyl carbonate, to a solution of 480 mg. of sodium in 21 ml. of absolute methanol. The mixture is then boiled for one hour, and 29 ml. of solvent are gradually distilled off under normal pressure. The residue of 20 g. of 3-amino-5-dimethylaminomethyl-2-oxazolidinone crystallizes during drying under a vacuum. 159 mg. of this compound is boiled for two hours with 155 mg. of 5-nitro-1-methyl-2-imidazolyl aldehyde in 3 ml. of ethanol with 0.096 ml. of 12.5 N HCl. By cooling and vacuum-filtering, 63 mg. of 3-(5-nitro-1-methyl - 2 - imidazolyl-methylenamino)-5-dimethylaminomethyl-2-oxazolidinone hydrochloride is obtained, M.P. 251° C.

By stirring 159 mg. of 3-amino-5-dimethylaminomethyl-2-oxazolidinone with 155 mg. of aldehyde in 1.5 ml. of water and 1.25 ml. of 1 N hydrochloric acid for three hours at room temperature, and then rendering the reaction mixture alkaline with 1 N potassium hydroxide, 73 mg. of the corresponding free base is obtained, M.P. 174° C.

EXAMPLE 12

11 g. (78 millimols) of 5-nitro-1-ethyl-imidazole is heated with 11.7 g. of paraformaldehyde in 57 ml. of dimethyl sulfoxide for 48 hours at 110° C. in a sealed tube. After distilling off the volatile components at 1 mm. Hg and 100° C. bath temperature, the residue is recrystallized twice from benzene, thus obtaining 5.1 g. of 5-nitro-1-ethyl-2-hydroxymethylimidazole, M.P. 101° C. 3.42 g. of this compound is boiled for 8 hours in 113 ml. of benzene with 15 g. of lead-IV-acetate. The benzenic solution is cooled, filtered, washed neutral, and dried. After evaporation under a vacuum, 2.37 g. of 5-nitro-1-ethyl-2-imidazolyl aldehyde is obtained in the form of an oil.

2.08 g. of this aldehyde is boiled for two hours in 36 ml. of ethanol with 2.25 g. of 3-amino-5-diethylaminomethyl-2-oxazolidinone and 1.15 ml. of 12.5 N methanolic hydrochloric acid. After mixing with twice the volume of isopropanol, the reaction mixture is cooled and vacuum-filtered, thus obtaining 1.6 g. of 3-(5-nitro-1-ethyl-2-imidazolyl-methylenamino)-5-diethylaminomethyl - 2 - oxazolidinone hydrochloride, M.P. 176° C.

EXAMPLE 13

4.0 g. of 5-nitro-1-butyl-2-hydroxymethyl-imidazole is treated with lead-IV-acetate and worked up as described in Example 12, thus obtaining 3.03 g. of 5-nitro-1-butyl-2-imidazolyl aldehyde as an oil. 610 mg. of this aldehyde is boiled for two hours in 10 ml. of ethanol with 580 mg. of 3 - amino-5-diethylaminomethyl-2-oxazolidinone and 0.3 ml. of 12.5 N methanolic hydrochloric acid. By concentration and preparative layer chromatography with methanol-chloroform, 1:1, 342 mg. of 3-(5-nitro-1-butyl-2-imidazolyl - methylenamino)-5-diethylaminomethyl - 2-oxazolidinone is obtained as the free base, M.P. 79° C.

EXAMPLE 14

2.84 g. of 5-nitro-1-(2-acetoxyethyl)-2-imidazolyl aldehyde is boiled for two hours in 40 ml. of ethanol with 2.34 g. of 3-amino-5-diehylaminomethyl-2-oxazolidinone and 1 ml. of 12.5 N methanolic hydrochloric acid. Cooling and vacuum-filtering results in 3.3 g. of 3-[5-nitro-1-(2-acetoxyethyl) - 2 - imidazolyl-methylenamino]-5-diethylaminomethyl-2-oxazolidinone hydrochloride, M.P. 203° C.

EXAMPLE 15

2.7 g. of 3-[5-nitro-1-(2-acetoxyethyl) - 2 - imidazolyl-methylenamino]-5-diethylaminomethyl - 2 - oxazolidinone hydrochloride is boiled for three hours in 75 ml. of ethanol with 0.15 ml. of 12.5 N methanolic hydrochloric acid. Cooling and vacuum-filtering results in 2.08 g. of 3-[5-nitro-1-(2-hydroxyethyl)-2-imidazolyl - methylenamino]-5-diethylaminomethyl - 2 - oxazolidinone hydrochloride, M.P. 175° C.

EXAMPLE 16

155 mg. of 5-nitro-1-methyl-2-imidazolyl aldehyde and 242 mg. of 3 - amino-5-dibutylaminomethyl-2-oxazolidinone are boiled for four hours in 3 ml. of ethanol with 0.096 ml. of 12.5 N methanolic hydrochloric acid. Cooling and vacuum-filtering results in 53 mg. of 3-(5-nitro-1-methyl-2-imidazolyl-methylenamino) - 5 - dibutylaminomethyl-2-oxazolidinone, remarkably in the form of the free base, M.P. 136° C.

EXAMPLE 17

155 mg. of 5-nitro-1-methyl-2-imidazolyl aldehyde and 211 mg. of 3-amino-5-diallylaminomethyl-2-oxazolidinone are stirred for 3 hours in 1.5 ml. of water and 1.5 ml. of 1 N hydrochloric acid. By rendering the reaction mixture alkaline with 1 N potassium hydroxide, a precipitate is obtained of 210 mg. of 3-(5-nitro-1-methyl-2-imidazolyl-methylenamino)-5-diallylaminomethyl - 2 - oxazolidinone, M.P. 157° C.

EXAMPLE 18

32.6 g. of 3-N-methylanilino-1,2-epoxypropane are added dropwise to 46.6 g. of hydrazine hydrate warmed to 55° C. During this procedure, the temperature rises to 95° C. After another 15 minutes at 100° C., the reaction mixture is concentrated under a vacuum. 1.95 g. of the thus-obtained crude 1-hydrazino-3-N-methylanilino-2-propanol is added dropwise with 1.3 g. of diethyl carbonate to a solution of 37 mg. of sodium in 1.6 ml. of methanol. The reaction mixture is gradually heated to a bath temperature of 110° C., and within one hour 2 ml. of solvent is distilled off under normal pressure. 221 mg. of the crude 3 - amino-5-N-methylanilinomethyl-2-oxa-zolidinone obtained in this manner is boiled for two hours with 155 mg. of 5-nitro-1-methyl-2--imidazolyl aldehyde in 3 ml. of ethanol and 0.096 ml. of 12.5 N methanolic hydrochloric acid. Cooling and vacuum-filtering results in 84 mg. of 3-(5-nitro-1-methyl-2-imidazolyl-methylenamino)-5-N-mehylanilinomethyl - 2 - oxazolidinone, M.P. 233° C.

By stirring the same amounts of starting compounds in 3 ml. of 0.5 N hydrochloric acid, 205 mg. of the same compound is obtained after two and one-half hours, as a precipitate.

EXAMPLE 19

12.0 g. of 3-hexylmercapto-1,2-epoxypropane are added dropwise at 90° C. to 17 g. of hydrazine hydrate; during this step, the temperature rises to 110° C. After another two hours at 100° C., the reaction mixture is concentrated by evaporation under a vacuum, thus obtaining 13.9 g. of 1-hydrazino-3-hexylmercapto-2-propanol as a crystalline residue, M.P. 45–50° C. 5.0 g. of this compound is added in 4 ml. of methanol with 2.8 g. of diethyl carbonate to a solution of 28 mg. of sodium in 1 ml. of methanol. Within one hour, 6 ml. of solvent is distilled off under normal pressure. The yield in crude 3-amino-5-hexylmercaptomethyl-2-oxazolidinone is 5.3 g. 500 mg. of this compound is boiled for one hour in 1.2 ml. of methanol with 333 mg. of 5-nitro-1-methyl-2-imidazolyl aldehyde. By cooling, mixing with 20 ml. of water, and vacuum-filtering, and after recrystallization from methanol, 121 mg. of 3-(5-nitro-1-methyl-2-imidazolyl-methylenamino)-5-hexylmercaptomethyl-2-oxazolidinone is obtained, M.P. 117° C.

EXAMPLE 20

50.5 g. of diisopropylamine is added to 47 g. of epichlorohydrin and 1 ml. of water, at 20° C. After allowing the reaction mixture to stand for eight hours at 50° C., it is cooled to 20–25° C., and at this tempertaure, 24 g. of sodium hydroxide in 40 ml. of water is added dropwise. After stirring the mixture for one hour, 100 ml. of water is added until the thus-formed sodium chloride is dissolved. The upper, organic layer is separated, and the aqueous phase is shaken out with ether three times. The combined organic phases are dried over potassium hydroxide, filtered, and the solvent is removed under a vacuum. By distilling the residue under 13 mm. Hg, at 70–81° C., 15.1 g. of 1-diisopropylamino-2,3-epoxypropane is obtained.

15.1 g. of this substance is added dropwise to 100% hydrazine hydrate, warmed to 55° C., under agitation. Then, the reaction mixture is gradually hated to 110° C. and stirred for 30 minutes at this temperature. Any excess hydrazine hydrate is removed under a vacuum, thus obtaining 16.0 g. of crude 1-diisopropylamino-3-hydrazino-2-propanol. 16.0 g. of this substance is added dropwise with 11.2 g. of diethyl carbonate to a solution of 310 mg. of sodium in 13.5 ml. of absolute methanol. Thereafter, the reaction mixture is heated within one hour to 110° C. (bath temperature), and within 1–2 hours, the solvents are distilled off under normal pressure. 18.4 g. of crude 3-amino-5-diisopropylaminomethyl-2-oxazolidinone is obtained as the residue.

215 mg. of this substance is carried at room temperature with 155 mg. of 5-nitro-1-methyl-2-imidazolyl aldehyde in 1.5 ml. of water and 1.25 ml. of 2 N hydrochloric acid. Then, the reaction mixture is rendered alkaline with 1 N potassium hydroxide solution, and vacuum-filtered. The precipitate is recrystallized from methanol, thus obtaining 175 mg. of 3-(5-nitro-1-methyl-2-imidazolyl-methylenamino)-5-diisopropylaminomethyl - 2 - oxazolidinone, M.P. 205–206° C.

EXAMPLE 21

Epichlorohydrin and di-n-propylamine result, as described in Example 20, the 1-di-n-propylamino-2,3-epoxypropane, but the reaction takes place more spontaneously, and must be maintained at 40–50° C. by cooling. Yield: 17%; boiling point at 13 mm. Hg: 70–77° C. Then, as described in Example 20, 1-di-n-propylamino - 3 - hydrazino-2-propanol (crude) is obtained with hydrazine hydrate, at a yield of 92%. From this product, with diethyl carbonate, 3-amino-5-di-n-propylaminomethyl - 2 - oxazolidinone (crude) is obtained with a 92% yield, and therefrom, with 5-nitro-1-methyl-2-imidazolyl aldehyde, 3-(5-nitro-1-methyl - 2 - imidazolyl-methylenamino)-5-di-n-propylaminomethyl-2-oxazolidinone is produced, M.P. 169–170° C. (from methanol-isopropanol) with a yield of 55%.

EXAMPLE 22

Epichlorohydrin and diisoamylamine result, as described in Example 20, in 1-diisoamylamino-2,3-epoxypropane; yield: 38%, boiling point at 12 mm. Hg: 115–117° C.

As described in Example 20, 1-diisoamylamino-3-hydrazino-2-propanol (crude) is obtained therefrom with hydrazine hydrate (but at 160° C.), at a yield of 70%; from this product, with diethyl carbonate, 3-amino-5-diisoamylaminomethyl-2-oxazolidinone (crude) is obtained at a yield of 82%, and from this compound, with 5-nitro-1-methyl-2-imidazolyl aldehyde, 3 - (5-nitro-1-methyl-2-imidazolyl - methylenamino)-5-diisoamylaminomethyl-2-oxazolidinone is obtained, M.P. 122–125° C. with a yield of 20%; this product crystallizes from the hydrochloric acid solution in the form of the free base.

EXAMPLE 23

Epichlorohydrin and 4 - methylpiperidine result, as described in Example 21, in 1 - (4-methylpiperidino)-2,3-epoxypropane. Yield: 50%; B.P. at 13 mm. Hg: 89–92° C.

As described in Example 20, there is produced therefrom, with hydrazine hydrate, 1-(4-methylpiperidino)-3-hydrazino-2-propanol (crude) with a yield of 80%, and from this product, with diethyl carbonate, 3-amino-5-(4-methylpiperidinomethyl)-2-oxazolidinone is obtained (recrystallized twice from isopropanol), at a yield of 23%.

2.76 g. of this substance and 2.0 g. of 5-nitro-1-methyl-2-imidazolyl aldehyde are boiled for two hours in 36 ml. of absolute ethanol with 1.16 ml. of 12.5 N methanolic hydrochloric acid. After cooling, vacuum-filtering, and recrystallization from methanol, 3-(5-nitro - 1 - methyl-2-imidazolyl - methylenamino) - 5 - (4 - methylpiperidinomethyl)-2-oxazolidinone hydrochloride is obtained at a yield of 63% and a melting point of 229–230° C.

EXAMPLE 24

As described in Example 20, 3-amino-5-pyrrolidinomethyl-2-oxazolidinone (crude) is obtained with a 70% yield from crude 1 - pyrrolidino-3-hydrazino-2-propanol and diethyl carbonate. 185 mg. of this substance and 155 mg. of 5-nitro-1-methyl-2-imidazolyl aldehyde are boiled for two hours in 3 ml. of absolute methanol with 0.1 ml. of 12.5 N methanolic hydrochloric acid. After cooling, mixing with isopropanol, and recrystallization of the thus-produced precipitate from isopropanol, 3-(5-nitro-1-methyl - 2 - imidazolyl-methylenamino) - 5 - pyrrolidinomethyl-2-oxazolidinone hydrochloride is obtained. Yield: 41 mg., M.P. 220–222° C.

EXAMPLE 25

As described in Example 20, 1-hexamethylenimino-3-hydrazino-2-propanol (crude) is obtained at an 83% yield from hexamethylenimine and hydrazine hydrate, and from this product, with diethyl carbonate, 3-amino-5-hexamethyleniminomethyl - 2 - oxazolidinone (crude) is produced with a yield of 100%.

2.56 g. of this substance is boiled for two hours with 1.86 g. of 5-nitro-1-methyl-2-imidazolyl aldehyde in 34 ml. of ethanol and 1.08 ml. of 12.5 N methanolic hydrochloric acid. After cooling, vacuum-filtering and recrystallization from methanol, 610 mg. of 3-(5-nitro-1-methyl-2-imidazolyl - methylenamino) - 5 - hexamethyleniminomethyl-2-oxazolidinone is obtained as the free base, M.P. 163–165° C. Hydrochloride: M.P. 235–238° C.

EXAMPLE 26

390 mg. of 3-[5-nitro-1-(2-hydroxyethyl)-2-imidazolylmethylenamino] - 5 - diethylaminomethyl-2-oxazolidinone hydrochloride is mixed in 4 ml. of pyridine with 1 ml. of dimethylformamide and 0.23 ml. of benzoyl chloride. After allowing the reaction mixture to stand for 24 hours at room temperature and for 1 hour at 50° C., it is poured into 60 ml. of ice water. The reaction product is vacuum-filtered from the thus-produced benzoic acid; the filtrate is washed with ethyl acetate and made alkaline with sodium hydroxide solution. The thus-produced precipitate is vacuum-filtered and recrystallized from ethanol, thus obtaining 40 mg. of 3-[5-nitro - 1 - (2-benzoyloxyethyl)-2-imidazolyl-methylenamino] - 5 - diethylaminomethyl-2-oxazolidinone, M.P. 168–170° C.

EXAMPLE 27

23 g. of epichlorohydrin and 41 g. of 1-octanethiol are mixed, under boiling heat, with 0.5 g. of zinc chloride. A violent exothermic reaction is thus initiated. After stirring the reaction mixture for one hour at 120° C., it is subjected to distillation, thus obtaining 32 g. of 1-chloro-3-octanethio-2-propanol, B.P. 126–136° C. at 0.2 mm. Hg. Refractive index: $n_D^{25}=1.4830$. 27 g. of this substance is mixed with 31 g. of potassium hydroxide in 40 ml. of water in such a manner that the temperature remains between 15 and 20° C. After two hours at room temperature, the reaction mixture is extracted with ether, the ether phases are dried, filtered, and concentrated under a vacuum. By distilling the residue, 8.6 g. of 1-octanethio-2,3-epoxypropane is obtained, B.P. 78–81° C. at 0.05 mm. Hg of pressure. Index of refraction: $n_D^{25}=1.4706$. The entire amount of substance is added dropwise at 90° C. to 10.5 g. of 98% hydrazine hydrate. After a further two hours at 100° C., the excess hydrazine hydrate is removed under a vacuum, thus obtaining 9.9 g. of 1-octanethio-3-hydrazino-2-propanol as a crystalline-hygroscopic residue. This substance is treated with diethyl carbonate, as described in Example 20, and yields 3-amino-5-octylthiomethyl-2-oxazolidinone (crude) with a yield of 80%.

560 mg. of this substance is boiled for one hour with 333 mg. of 5-nitro-1-methyl-2-imidazolyl aldehyde in 1.2 ml. of absolute methanol and 0.2 ml. of 12.5 N methanolic hydrochloric acid. After cooling, the reaction mixture is mixed with a small amount of water, vacuum-filtered, and the precipitate recrystallized twice from methanol-water, thus obtaining 152 mg. of 3-(5-nitro-1-methyl-2-imidazolyl - methylenamino)-5-octylthiomethyl-2-oxazolidinone, M.P. 101–103° C.

EXAMPLE 28

To a solution of 120 mg. of sodium in 4 ml. of absolute methanol, 11.8 g. of diethyl carbonate is added, and to this mixture is further added 16.8 g. of 1-methylsulfonyl-3-hydrazino-2-propanol. The reaction mixture is gradually heated to 110° C., and during this process, solvent is distilled off. The residue is diluted with 30 ml. of ethanol, and 10 ml. of 12.5 N methanolic hydrochloric acid is added thereto, as well as 15.5 g. of 5-nitro-1-methyl-2-imidazolyl aldehyde. After boiling for one hour, the reaction mixture is cooled and diluted with a small amount of water. By recrystallization of the vacuum-filtered precipitate from acetone/water, 7 g. of 3-(5-nitro-1-methyl-2-imidazolyl-methylenamino) - 5 - methylsulfonylmethyl-2-oxazolidinone is produced, M.P. 216–218° C.

EXAMPLE 29

2 g. of 5-nitro-1-(2-benzoyloxyethyl)-imidazole, 1.15 g. of paraformaldehyde, and 7 ml. of dimethyl sulfoxide are treated for 24 hours in a bomb tube at 110° C. The residue obtained after removal of the solvent is extracted with benzene. From the benzene crystallizes 345 mg. of 5-nitro-2-hydroxymethyl - 1 - (2-benzoyloxyethyl)-imidazole, M.P. 136–139° C. 264 mg. of this substance is boiled for eight hours in 5 ml. of benzene with 656 mg. of lead-IV-acetate. After vacuum-filtering, mixing the filtrate with water, washing it neutral, and concentrating the organic phase, 224 mg. of 5-nitro-1-(2-benzoyloxyethyl)-2-imidazolyl aldehyde is obtained, M.P. 113–114° C.

145 mg. of this compound is boiled for one hour with 93 mg. of 3-amino-5-diethylaminomethyl-2-oxazolidinone in 4 ml. of alcohol with 0.05 ml. of 12.5 N methanolic hydrochloric acid. After cooling, vacuum-filtering, taking up the precipitate in methanol-water, and mixing the solution with aqueous solution of sodium hydroxide, 40 mg. of 3-[5-nitro-1-(2-benzoyloxyethyl) - 2 - imidazolyl-methylenamino] - 5 - diethylaminomethyl - 2 - oxazolidinone is obtained, M.P. 168–170° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 3 - (5-nitro-2-imidazolyl-methyleneamino)-2-oxazolidinone of the formula

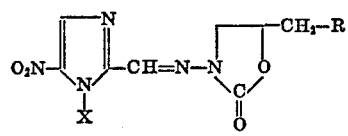

wherein X is alkyl of 1–5 carbon atoms or alkyl of 2–5 carbon atoms substituted at the 2-position by a hydroxy, alkanoyloxy of 1–5 carbon atoms or benzoyloxy, and R is either the group S—A or SO₂—A in which A is alkyl of 1–10 carbon atoms or the group

in which $R_1$ and $R_2$ each are alkyl of 1–5 carbon atoms, phenyl or benzyl, or, collectively with the N-atom, a pyrrolidino, piperidino, homopiperidino, morpholino, piperazino or a corresponding ring substituted by alkyl of 1–5 carbon atoms or a pharmaceutically acceptable acid addition salt thereof.

2. A compound of claim 1 wherein X is lower-alkyl.

3. A compound of claim 1 wherein X is selected from the group consisting of hydroxyethyl and acyloxyethyl wherein acyl is alkanoyl of 1–4 carbon atoms or benzoyl.

4. A compound of claim 1 wherein R is dialkylamino each alkyl of which contains 1–5 carbon atoms.

5. A compound of claim 1 wherein R is diethylamino.

6. A compound of claim 1 wherein R is selected from the group consisting of —S—alkyl, —S=O—alkyl, and

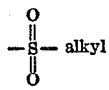

wherein alkyl contains 1–6 carbon atoms.

7. A compound of claim 1, 3-(5-nitro-1-methyl-2-imidazolyl - methylenamino) - 5 - diethylaminomethyl-2-oxazolidinone hydrochloride.

8. A compound of claim 1, 3-(5-nitro-1-methyl-2-imidazolyl - methylenamino) - 5 - isopropylthiomethyl-2-oxazolidinone.

9. A compound of claim 1, 3-(5-nitro-1-methyl-2-imidazolyl - methylenamino) - 5 - butylthiomethyl-2-oxazolidinone.

10. A compound of claim 1, 3-(5-nitro-1-methyl-2-imidazolyl - methylenamino) - 5 - methylsulfonylmethyl-2-oxazolidinone.

11. A compound of claim 1 selected from the group consisting of 3-(5-nitro-1-methyl-2-imidazolyl-methylenamino)-5-dimethylaminomethyl - 2 - oxazolidinone and 3-(5-nitro-1-methyl - 2 - imidazolyl-methylenamino - 5 - dimethylaminomethyl-2-oxazolidinone hydrochloride.

12. A compound of claim 1, 3-(5-nitro-1-methyl-2-imidazolyl - methylenamino) - 5 - dibutylaminomethyl-2-oxazolidinone.

13. A compound of claim 1, 3-(5-nitro-1-methyl-2-imidazolyl - methylenamino) - 5 - diallylaminomethyl-2-oxazolidinone.

14. A compound of claim 1, 3-(5-nitro-1-methyl-2-imidazolyl - methylenamino) - 5 - N - methyl - anilinomethyl-2-oxazolidinone.

15. A compound of claim 1, 3-(5-nitro-1-methyl-2-imidazolyl - methylenamino) - 5 - hexylmercaptomethyl-2-oxazolidinone.

16. A compound of claim 1, 3-(5-nitro-1-methyl-2-imidazolyl-methylenamino) - 5 - diisoamylaminomethyl-2-oxazolidinone.

17. A compound of claim 1, 3-(5-nitro-1-methyl-2-imidazolyl - methylenamino) - 5 - octylthiomethyl - 2-oxazolidinone.

18. A compound of claim 1, 3-(5-nitro-1-methyl-2-imidazolyl - methylenamino) - 5 - piperidinomethyl-2-oxazolidinone.

19. A compound of claim 1, 3-(5-nitro-1-methyl-2-imidazolyl - methylenamino) - 5 - piperidinomethyl-2-oxazolidinone hydrochloride.

20. A compound of claim 1, 3-(5-nitro-1-methyl-2-imidazolyl - methylenamino) - 5 - morpholinomethyl-2-oxazolidinone hydrochloride.

21. A compound of claim 1, 3-(5-nitro-1-methyl-2-imidazolyl - methylenamino) - 5 - (4 - methylpiperazinomethyl)-2-oxazolidinone hydrochloride.

22. A compound of claim 1, 3-(5-nitro-1-methyl-2-imidazolyl - methylenamino) - 5 - 4 - methylpiperidinomethyl-2-oxazolidinone hydrochloride.

23. A compound of claim 1, 3-(5-nitro-1-methyl-2-imidazolyl - methylenamino) - 5 - pyrrolidinomethyl-2-oxazolidinone hydrochloride.

24. A compound of claim 1, 3-(5-nitro-1-methyl-2-imidazolyl - methylenamino) - 5 - hexamethyleniminomethyl-2-oxazolidinone.

25. A compound of claim 1, 3-(5-nitro-1-methyl-2-imidazolyl - methylenamino) - 5 - hexamethyleniminomethyl-2-oxazolidinone hydrochloride.

26. A compound of claim 1, 3-(5-nitro-1-methyl-2-imidazolyl - methylenamino) - 5 - methylthiomethyl-2-oxazolidinone.

27. A compound of claim 1, 3-(5-nitro-1-methyl-2-imidazolyl - methylenamino) - 5 - ethylthiomethyl-2-oxazolidinone.

28. A compound of claim 1, 3-(5-nitro-1-ethyl-2-imidazolyl - methylenamino) - 5 - diethylaminomethyl-2-oxazolidinone.

29. A compound of claim 1, 3-(5-nitro-1-butyl-2-imidazolyl - methylenamino) - 5 - diethylaminomethyl-2-oxazolidinone hydrochloride.

30. A compound of claim 1, 3-[5-nitro-1-(2-acetoxyethyl)-2-imidazolyl - methylenamino] - 5 - diethylamino-2-oxazolidinone hydrochloride.

31. A compound of claim 1, 3-[5-nitro-(2-hydroxyethyl)-2-imidazolyl - methylenamino] - 5 - diethylaminoethyl-2-oxazolidinone hydrochloride.

32. A compound of claim 1, 3-[5-nitro-1-(2-benzoyloxyethyl) - 2 - imidazolyl - methylenamino] - 5 - diethylaminomethyl-2-oxazolidinone.

33. A compound of claim 1, 3-(5-nitro-1-methyl-2-imidazolyl - methylenamino) - 5 - diisopropylaminomethyl-2-oxazolidinone.

34. A compound of claim 1, 3-(5-nitro-1-methyl-2-imidazolyl - methylenamino) - 5 - di - n - propylaminomethyl-2-oxazolidinone.

References Cited

UNITED STATES PATENTS

| | | | |
|---|---|---|---|
| 3,452,035 | 6/1969 | Berkelhammer et al. | 260—306.8 |
| 3,288,787 | 11/1966 | Massaroli | 260—240 |
| 3,318,878 | 5/1967 | Dunn | 260—240 |
| 3,272,828 | 9/1966 | Von Esch | 260—295 |

FOREIGN PATENTS

| | | | |
|---|---|---|---|
| 417,585 | 8/1963 | Japan | 260—240 |

HENRY R. JILES, Primary Examiner

G. T. TODD, Assistant Examiner

U.S. Cl. X.R.

260—240.1; 424—248, 250, 267, 272